United States Patent [19]

Anderson

[11] Patent Number: 5,212,958
[45] Date of Patent: May 25, 1993

[54] DEHUMIDIFIER APPARATUS WITH PUMP

[76] Inventor: John C. Anderson, 31 Blueberry Hill Rd., Hyannis, Mass. 02601

[21] Appl. No.: 809,740

[22] Filed: Dec. 17, 1991

Related U.S. Application Data

[63] Continuation-in-part of Ser. No. 518,789, May 4, 1990, Pat. No. 5,074,119.

[51] Int. Cl.$^5$ ............................................. F25D 23/14
[52] U.S. Cl. ................................. 62/150; 62/285; 62/291; 417/36; 417/40; 417/411
[58] Field of Search .................... 62/150, 285, 291; 417/36, 38, 40, 411

[56] References Cited

U.S. PATENT DOCUMENTS

| | | | |
|---|---|---|---|
| 3,758,236 | 9/1923 | Zimmerman | 417/40 |
| 3,807,900 | 4/1974 | Delancey et al. | 417/40 |
| 4,050,396 | 9/1977 | Ridgeway | 417/40 |
| 4,218,195 | 8/1980 | Shure | 417/411 |
| 4,903,723 | 2/1990 | Sublett | 417/36 |
| 5,074,119 | 12/1991 | Anderson | 62/150 |

Primary Examiner—Albert W. Davis, Jr.
Attorney, Agent, or Firm—Thomas A. Kahrl

[57] ABSTRACT

The present invention provides a pump pack for automatic and continuous emptying of water condensate from a dehumidifier positioned below ground level or remotely from a gravity drain. The present invention includes a small submersible electrical pump powered by a conventional 110 volt AC power source, includes an on/off float switch connected with the power source, in cooperation with a flexible hose of small diameter of variable length. Condensate collected in the water collection pan is withdrawn at a preselected water level by the pump and passes through the tubing to an elevated or remote drain means or to other appropriate areas for disposal. The present invention permits continuous operation of portable dehumidifiers which would otherwise shut off when the condensate water pan fills after approximately one day's unattended use.

4 Claims, 2 Drawing Sheets

DEHUMIDIFIER APPARATUS WITH PUMP

REFERENCE TO PRIOR APPLICATION

This application is a continuation in part of U.S. patent application Ser. No. 07/518,789 filed May 4, 1990, now U.S. Pat. No. 5,074,119, which is incorporated herein by reference.

BACKGROUND OF THE INVENTION

Portable dehumidifiers have been found useful in controlling the moisture content in the air contained in interior rooms of buildings. Use of dehumidifiers has been found particularly beneficial in removing excess moisture which otherwise causes damage to articles stored or contained in such interior rooms due to the formation of mildew or mold on such articles. In modern buildings where storage space is scarce, cellars have increasingly been used for storage as well as living spaces, despite the fact that cellars, at certain times of the year; are generally known to be damp, located below grade level, lacking access to sunlight, and having porous cement walls, typically are damp. Such spaces are probably the most appropriate spaces for dehumidification, and homeowners frequently employ portable dehumidifiers to overcome problems of excess moisture, however most cellars lack drains to carry away condensate collected by the dehumidifier.

Prior art dehumidifiers such as shown in U.S. Pat. Nos. 2,627,669, 3,199,307, 4,135,370 and 4,603,489 typically have gravity drains to permit continuous operations. Alternatively, portable dehumidifiers typically employ drip pans which are used to collect liquid condensate to be emptied once a day when the pan is filled, with a shut off mechanism to turn the dehumidifier off in the event the pan is not emptied on a daily basis. Emptying the pans requires removal of the pan from the dehumidifier which is heavy when filled with water with risk of spillage and carrying the pan upstairs or out of doors, to be followed by the return of the pan reinstallation, all of which is laborious and time consuming.

Inasmuch as most cellars are below the drain outlet for the house, the gravity feed of the prior art dehumidifiers cannot be used. Consequently the vast majority of portable dehumidifiers installed in the cellar, basement or rooms not having access to a drain, must be emptied daily by the user at great inconvenience. If left unattended the dehumidifier ceases operation upon the filling of the pan.

It is therefore desirable to provide a simple, effective, portable dehumidifier apparatus and pump pack in order to provide for improved drainage, particularly when located in rooms located below grade such as a cellar or basement.

SUMMARY OF THE INVENTION

This invention relates to an improved dehumidifier apparatus with pump pack apparatus for providing for the controlled removal of liquid condensate from a portable dehumidifier.

In particular, the invention concerns automatic removal, preferably by pumping, of accumulated condensate in portable dehumidifiers by means of an electrical submersible pump wherein the dehumidifier is located below or away from access to available drainage systems.

In one embodiment, a simple, inexpensive, pump pack apparatus has been discovered for use in combination with a portable dehumidifier apparatus for automatic controlled pumping of accumulated condensate, typically in the form of water, from a collection pan in the portable dehumidifier apparatus which is positioned below available drainage, such as in cellars. The dehumidifier apparatus typically comprises a housing, having an upper chamber and a lower chamber, the upper chamber having an air inlet and an air outlet, a dehumidifier provided in the upper chamber together with a circulating fan for drawing outside air into the upper chamber for contacting the dehumidifier, the dehumidifier adapted to remove moisture from surrounding air to form a liquid condensate in the form of droplets which have a natural tendency to drop from the dehumidifier downwardly into the lower chamber, a collection pan mounted in the lower chamber for the accumulation of droplets of liquid condensate, a float to sense the level of condensate in the collection pan, to alternatively energize the dehumidifier for removing moisture from the air with condensate being collected in the drain pan until the collection pan becomes filled, whereupon the switch, typically a pressure switch or alternatively a float operated switch de-energizes the dehumidifier to prevent the pan from over flowing. The dehumidifier apparatus also includes a plurality of wheels positioned on the base of the lower chamber for the portable movement of the apparatus to a location characterized by high humidity, typically a basement space. The collection pan is of generally rectangular construction, typically consisting of a lightweight plastic material, and is removably disposed within the lower chamber at the base thereof extending over the entire base area for collecting condensate dripping downwardly from the dehumidifier.

The pump pack apparatus is adapted to be connected electrically to a power source and includes a pump, typically an electric submersible pump, the pump being positioned in the condensate pan to be submerged in the collected condensate and to pump the liquid condensate from the pan to an elevated drain system; a float switch apparatus mechanically connected to the pump for control ling the pump to be activated for pumping when the pan is full and for de-energizing the pump when the condensate has been completely evacuated from the condensate pan, the float switch apparatus being activated to pump at predetermined level of liquid condensate in the pan; and an elongated tubing, of small diameter extending, from the pump to an elevated drain system, typically via a casement window providing access to the outside environment, such as a section of lawn or alternatively to a remote drainage system permitting continuous operation of the dehumidifier apparatus to continuously remove moisture from the air of the room or space in which the dehumidifier is located. The pump pack also includes an attachment for attaching the pump pack to the dehumidifier. The pump pack further includes an on/off switch positioned in the condensate drain pan connected to the float used for sensing the water level and said switch adapted for activating the pump.

In the preferred embodiment of the present invention, a 110 AC volt power outlet is connected directly to a circuit contained in the dehumidifier called a full pan circuit.

In another embodiment, the pump pack apparatus is adapted for use in combination with a portable dehumidifier apparatus for automatic controlled pumping of accumulated condensate, typically in the form of water, from a collection pan in the portable dehumidifier apparatus which is positioned below available drainage, such as in cellars. The dehumidifier apparatus typically comprises a housing, having an upper chamber and a lower chamber, the upper chamber having an air inlet and an air outlet, a dehumidifier coil of conventional construction well known in the art is provided in the upper chamber together with a circulating fan for drawing outside air into the upper chamber for contacting the dehumidifier coil, the dehumidifier coil adapted to remove moisture from surrounding air to form a liquid condensate. The liquid condensate is in the form of droplets which have a natural tendency to drop from the dehumidifier coil downwardly into the lower chamber, into a collection pan adapted for manual removal for draining is mounted in the lower chamber for the accumulation of droplets of liquid condensate. A float of conventional construction hingedly mounted for operation between a lower, "empty", de-energized position and an upper "full" energized position to sense the level of condensate in the collection pan, and to selectively energize the dehumidifier apparatus for removing moisture from the air with condensate being collected in the collection pan until said pan becomes filled, whereupon the float activates a switch, typically a float operated switch to de-energize the dehumidifier apparatus to prevent the collection pan from over flowing.

The pump pack apparatus is adapted to be connected electrically to a power source and comprises an electrically operated submersible pump, the pump being positioned in the collection pan and removably attached thereto to be submerged for operation in the collected condensate and to pump the liquid condensate from the collection pan to an elevated drain system. Said pump pack apparatus includes a float switch of conventional construction for controlling the pump selectively to a pumping mode when the collection pan is full and for a de-energized mode when the condensate has been completely pumped from the collection pan, said float switch being activated to pump at predetermined level of liquid condensate in the collection pan. The pump pack apparatus further includes an elongated, flexible tube of small diameter extending from the submersible pump to a remote drain system or alternatively to a remote and elevated drain system. The pump pack apparatus typically comprises an electrical submersible pump of waterproof construction which is adapted to be submerged in the condensate for operating.

The float switch is adapted to operate the pump apparatus intermittently to reduce the level of condensate in the collection pan from a higher filled level to a low empty level by pumping the condensate out of the pan through the elongated flexible tube to an elevated or remote drain, typically via a casement window providing access to the outside environment such as a section of lawn, or alternatively to a remote drainage system, thereby to permit continuous operation of the dehumidifier apparatus to continuously remove moisture from the air of the room or space in which the dehumidifier is located. The pump pack apparatus includes an attachment for attaching the submersible pump to a wall of the collection pan of the dehumidifier apparatus.

In this embodiment of the present invention, a 110 AC volt power outlet is connected directly to a circuit contained in the dehumidifier called a full pan circuit such that when the full pan light is energized, power is supplied directly to the submersible pump for continual operation until enough water is pumped out of the pan so the dehumidifier may resume operation. Typically at such time as a pressure switch positioned beneath the condensate pan indicates that the pan is full, the dehumidifier is de-energized until such time as the water level in the pan is lowered by the pumping action. In the alternate embodiment, the full light circuit is utilized for energizing and de-energizing the pump, whereas in the prior embodiment, the float switch is used to energize and de-energize the pump.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

DESCRIPTION OF THE EMBODIMENTS

Figure 1:
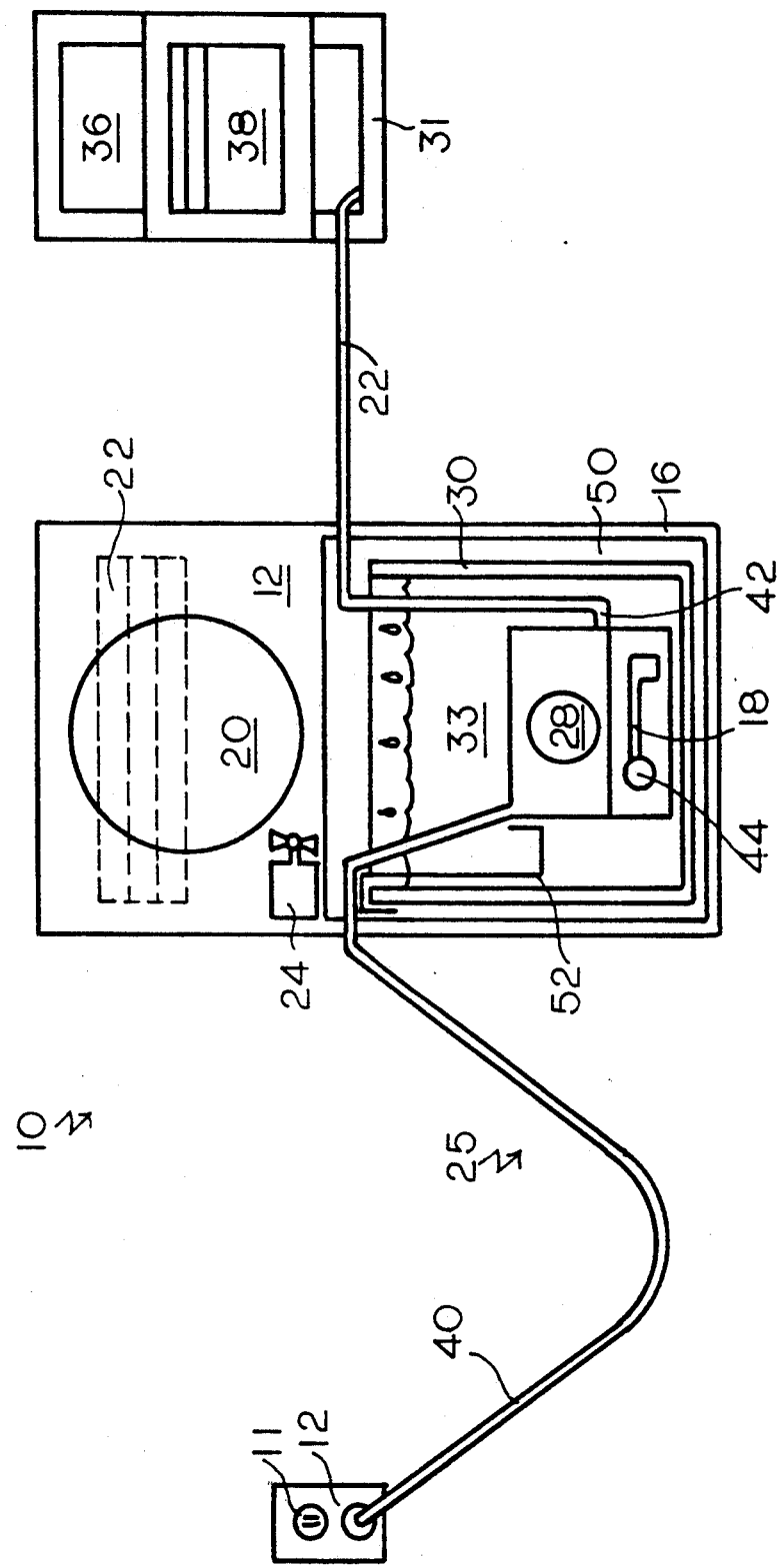
FIG. 1 is a block diagram illustrating a preferred arrangement of a dehumidifier of the invention with the pump connected directly to the power source.
Figure 2:
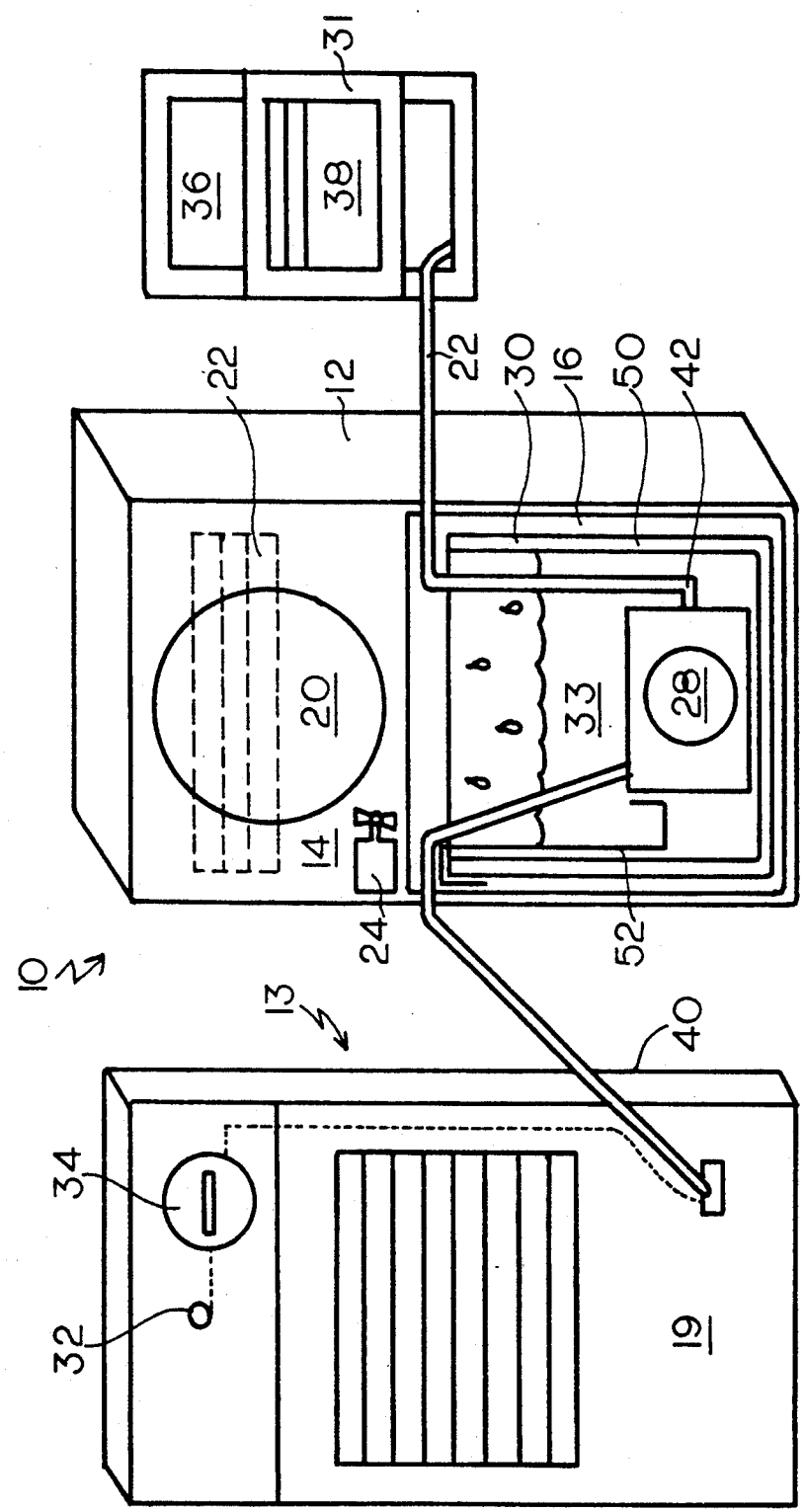
FIG. 2 is a block diagram illustrating an alternative arrangement of a dehumidifier of the invention with the pump connected to the float switch.

With reference to the drawings, FIG. 1 is a diagrammatic view of the dehumidifier apparatus 10 having a housing 12, having a front cover 13 shown in FIG. 2, an upper chamber 14 and a lower chamber 16, the upper chamber 14 having an air inlet 19 and an air outlet 20 and provided with a dehumidifier 22 and a motor blower 24 for drawing outside air into the upper chamber 14 for contacting the dehumidifier to form condensate 33 to be collected in a collection pan 30. The dehumidifier apparatus 10 of the invention as shown in FIG. 1 shows an electric power source 11 and a pump pack 25 comprising an electric pump 28 positioned in the collection pan 30 contained within the housing 12 of the dehumidifier apparatus 10. The pump apparatus 28 includes a float switch 18 and is connected to a tube 22 extending a substantial distance for positioning in an illustrated casement window 31, said elongated tube 22 being of flexible construction the pump 28 being connected to a float switch 18 in turn collected to the power source 12.

A full light switch 32 is connected to an electrical circuit not shown for indicating when the condensate pan 30 is full of condensate 33 whereupon a circuit and a humidistat control 34 is provided for controlling the amount of moisture to be removed from the air. Also the window of conventional construction, typically a basement casement window having an upper pane 36 and a lower movable pane 38 of glass which is slideably mounted for movement between an open and closed position.

The pump pack 52 is connected to the power source 12 adapted to supply electric power to the pump 28, and includes an output, port 42. Said pump pack is attached to a wall 50 of the collection pan 30 by attachment 52. An on/off switch 44 is provided on pump 28, said pump being attached to a tube 22 having a one and other end, one end attached to the output port 42 of the pump, the other end positioned in an elevated drain typically a casement window 31 and a float switch 18 for measuring the level of condensate 33 in the collection pan 30.

What is claimed is:

1. A pump pack apparatus in combination with a dehumidifier apparatus device comprising:
   a) a portable dehumidifier device adapted for use in below grade building locations comprising;
      i) a housing having an air inlet and an air outlet and an upper chamber and a lower chamber;
      ii) an electrically operated dehumidifier means for condensing moisture from the surrounding air and forming liquid water condensate to dehumidify the air;
      iii) a collection means having a side wall positioned in said lower chamber to collect liquid condensate generated by said dehumidifier means located in the upper chamber;
      iv) a motor blower means to draw moisture laden air into the air outlet, to circulate the air across said dehumidifier means and to discharge dehumidified air from the air outlet;
      v) a switch means for controlling the operation of the dehumidifier to intermittently activate and deactivate the dehumidifier means; and
      vi) a sensing means to sense the level of condensate in the collection means;
   b) a pump pack means for automatically removing liquid condensate from the collection means permitting continuous operation of the dehumidifier means mounted in the collection means comprising:
      i) a submersible electric pump means for pumping the liquid condensate from the collection means to an elevated or remote drain via a tube means;
      ii) mounting means to attach the pump pack means to the sidewall of the collection means;
      iii) an external tube means having a one end and an other end, the one end attached to the submersible electric pump and the other end adapted to communicate with an elevated, remotely located drain, the tube means being of elongated construction and extending from the submersible electric pump means to provide a conduit for carrying away the water condensate; and
      iv) float switch means mounted on the pump and connected electrically to the sensing means and to the submersible pump for controlling the operation of the pump for evacuating condensate from the collection means via the drain tubing means connected to an elevated drain to permit continuous unattended operation of the dehumidifier apparatus.

2. The apparatus of claim 1 wherein the collection means tion means comprises a collection pan having a side wall 3. The apparatus of claim 2 wherein the electric submersible pump is electrically powered and is constructed to be submerged in the condensate water and is continuously held in place on the wall of the collection pan by the mounting means.

4. A dehumidifier apparatus in combination with a submersible pump device comprising:
   a) a portable dehumidifier device adapted for use in below - grade building locations comprising;
      i) a housing having an air inlet and an air outlet and an upper chamber and a lower chamber;
      ii) an electrically operated dehumidifier means for condensing moisture from the surrounding air and forming liquid water condensate to dehumidify the air;
      iii) a collection means including a wall, mounted in the base located in the lower chamber of the housing, to collect liquid condensate generated by the dehumidifier means, located in the upper chamber of said housing, and adapted to be manually removed from the housing for emptying the within - contained condensate;
      iv) a motor blower means to draw moisture laden air into the air outlet, to circulate the air across the dehumidifier means, and to discharge dehumidified air from the air outlet;
      v) a switch circuit means for controlling the operation of the dehumidifier;
      vi) a float switch means to sense the level of condensate in the collection means connected electrically to the switch circuit means to intermittently activate and deactivate the dehumidifier means;
   b) a submersible pump means to automatically remove liquid condensate from the collection means to permit continuous operation of the dehumidifier means comprising;
      i) a submersible electric pump means to pump the liquid condensate from the collection means to an elevated or remote drain via a tube means;
      ii) mounting means to attach the submersible pump means to the wall of the collection means;
      iii) an external tube means having a one end and an other end, the one end attached to the submersible electric pump and the other end adapted to communicate with an elevated, remotely located drain, said external tube means being of elongated construction and extending from the submersible electric pump means to provide a conduit for carrying away the water condensate and;
      iv) a pump switch connected to the switch circuit means.

* * * * *